(12) United States Patent
Gautier et al.

(10) Patent No.: US 6,983,013 B1
(45) Date of Patent: Jan. 3, 2006

(54) METHOD AND DEVICE FOR ENCODING VIDEO SIGNAL

(75) Inventors: Pierre Gautier, Nogent-sur-Marne (FR); Sandra Del Corso, Clamart (FR); Isabelle Lemaguet, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 756 days.

(21) Appl. No.: 09/806,091

(22) PCT Filed: Jul. 31, 2000

(86) PCT No.: PCT/EP00/07425

§ 371 (c)(1),
(2), (4) Date: Mar. 26, 2001

(87) PCT Pub. No.: WO01/10133

PCT Pub. Date: Feb. 8, 2001

(30) Foreign Application Priority Data

Aug. 3, 1999 (EP) .................................. 99401969
Dec. 21, 1999 (EP) .................................. 99403228

(51) Int. Cl.
*H04N 7/12* (2006.01)
(52) U.S. Cl. ..................................... 375/240
(58) Field of Classification Search ........... 375/240.05, 375/240.18, 240.12, 240.01; 348/430, 443, 348/407, 97, 415, 423, 401, 459, 416
See application file for complete search history.

(56) References Cited

U.S. PATENT DOCUMENTS 5,084,755 A * 1/1992 Ozaki ........................... 348/97
5,491,516 A * 2/1996 Casavant et al. ......... 375/240.12
6,091,776 A * 7/2000 Linzer .................... 375/240.12
6,449,015 B1 * 9/2002 Sugaya ........................ 348/459
6,496,598 B1 * 12/2002 Harman ....................... 382/154

FOREIGN PATENT DOCUMENTS

WO    GB9701033    4/1997
WO    EP0007425    7/2000

* cited by examiner

*Primary Examiner*—Vu Le
*Assistant Examiner*—Behrooz Senfi

(57) ABSTRACT

The invention relates to the processing of video signals prior to encoding or other compression operations, and, more particularly, to a method for encoding video signals corresponding to a sequence of frames each of which consists of two fields F1 and F2. The proposed method comprises the steps of receiving successive frames of an input video signal and delaying them with at least a "two fields" duration delay, and detecting any dominance change and adjusting said delay. When a change from an F1 dominance to an F2 dominance is detected, the first field of the first F2 dominant frame is suppressed, and said delay is decreased by a quantity equal to "one field" duration; when a change from an F2 dominance to an F1 dominance is detected, the last field of the last F2 dominant frame is repeated, and the delay is further increased by a quantity equal to "one field" duration.

The invention also relates to a method for encoding a sequence of frames including either video-type images or film-type images, and to an encoding system that carries out said method by incorporating the first solution hereinabove presented. If a sequence of film-type is detected, the inverse 3:2 pull-down technique is applied on the input frames, while in the opposite case, said technique is de-activated and replaced by said first solution: preprocessing according to the type of dominance change.

7 Claims, 5 Drawing Sheets

METHOD AND DEVICE FOR ENCODING VIDEO SIGNAL

FIELD OF THE INVENTION

The present invention relates to a method for encoding video signals corresponding to a sequence of frames each of which originally consists of two fields F1 and F2, and to a corresponding encoding device.

BACKGROUND OF THE INVENTION

In a video sequence, composed of successive interlaced pictures (or frames), each frame is constituted by a pair of fields F1 and F2, as illustrated in FIG. 1 showing successive pairs of fields (each frame comprises a top field F(2n−1) (with n>0), or odd field, and a bottom field F(2n), or even field, the odd frames being of type F1 and the even frames of type F2) and the associated synchronization signal. When such video fields come out, for instance at a rate of 50 fields/second (25 frames/second) or 60 fields/second (30 frames/second), either of a video camera or of any other type of video signal generator, the video material has no field dominance (a frame is said to be "F1 dominant" if it is constituted by a first field F1 followed by a second field F2, and to be "F2 dominant" if it is constituted by a field F2 followed by a field F1).

The field dominance becomes relevant when transferring data in such a way that frame boundaries must be known and preserved. When the video material is edited at frame boundaries, with a video recorder for example, a decision is provided for specifying if the video material is F1 dominant or F2 dominant: FIGS. 3 and 4 respectively show, for a preexisting video material as indicated in FIG. 2, the structure of a F1 dominant video material and of a F2 dominant video material. Once some material has acquired a particular chrominance, it must be manipulated with that dominance. Otherwise, a shift can occur in the representation of a frame, as shown in FIG. 5: the two first frames are F1 dominant, but the third one is F2 dominant and composed of two fields which originally did not belong to the same frame. In such a case, encoding is less efficient: a scene cut between the two fields of an encoded frame costs a lot in terms of bitrate allocation efficiency. Moreover, F2 dominance may lead to annoying vertical moving of pictures when a DVD player outputs frames in slow motion or still image mode.

SUMMARY OF THE INVENTION

It is therefore an object of the invention to propose an encoding method in which the above-indicated drawbacks are avoided and the picture quality of any encoded video programme is increased.

To this end, the invention relates to a method such as described in the introductory paragraph of the description and in which the encoding step is preceded by a preprocessing step which comprises the sub-steps of:

(A) receiving the successive frames and delaying them with at least a "two fields" duration delay;
(B) adjusting said delay according to the following dominance change criterion:
  (a) when a change from an F1 dominance to an F2 dominance is detected, the first field of the first F2 dominant frame is suppressed, said delay being therefore decreased by a quantity equal to "one field" duration;
  (b) when a change from an F2 dominance to an F1 dominance is detected, the last field of the last F2 dominant frame is repeated, the delay being therefore further increased by a quantity equal to "one field" duration.

The method thus proposed allows to detect the changes in field dominance and to correct the input sequencing so that the frames can now be encoded correctly.

In an improved embodiment of the invention, in which the sequence of frames is constituted either by film-type images, to which the 3:2 pull-down technique has been applied, or by video-type images consisting of two fields, said method comprises the steps of:

(A) detecting that the current sequence is constituted by film-type images;
(B) encoding said current sequence, either after said pre-processing step when it is not detected as being of film-type or after implementation, on said current sequence, of the inverse 3:2 pull-down technique if it is detected as being of film-type; and said detecting step comprises the sub-steps of:
  (a) defining for two successive fields F(n) and F(n+2) of the same parity a number of pixels N2 such as N2=NTOT−N'2, where NTOT is the number of pixels in a field, N'2 is the number of pixels for which ABS (val F(n)−val F(n+2))<TH2, ABS designates the function "absolute value", val designates the luminance of a pixel, and TH2 is a first predefined threshold;
  (b) comparing the result of the subtraction of two consecutive numbers N2, divided by NTOT, to a second predefined threshold THR;
  (c) detecting that the current sequence is constituted by film-type images only when said result is lower than said second threshold, said fields being then considered as equal.

It is also an object of the invention to propose a corresponding encoding device.

To this end, the invention relates to a device for encoding video signals corresponding to a sequence of frames each of which originally consists of two fields F1 and F2, said sequence being constituted either by film-type images, to which the 3:2 pull-down technique has been applied, or by video-type images consisting of two fields, said device comprising:

(A) means for detecting in the input sequence of frames a sequence of film-type images;
(B) means for receiving the successive frames of the input sequence, delaying each of them with a delay of at least two fields, and adjusting said delay according to the following dominance charge criterion:
  (a) when a change from an F1 dominance to an F2 dominance is detected, the first field of the first F2 dominant frame is suppressed, said delay being therefore decreased by a quantity equal to "one field" duration;
  (b) when a change from an F2 dominance to an F1 dominance is detected, the last field of the last F2 dominant frame is repeated, the delay being therefore increased by a quantity equal to "one field" duration.
(C) means for encoding the input sequence of frames, either connected in series with means (B) when said sequence is not detected as being of film-type or after implementation of the inverse 3:2 pull-down technique if it is detected as being of film-type.

BRIEF DESCRIPTION OF THE DRAWINGS

The particularities of the invention will now be explained in a more detailed manner, with reference to the accompanying drawings in which.

DETAILED DESCRIPTION OF THE INVENTION

Figure 1:
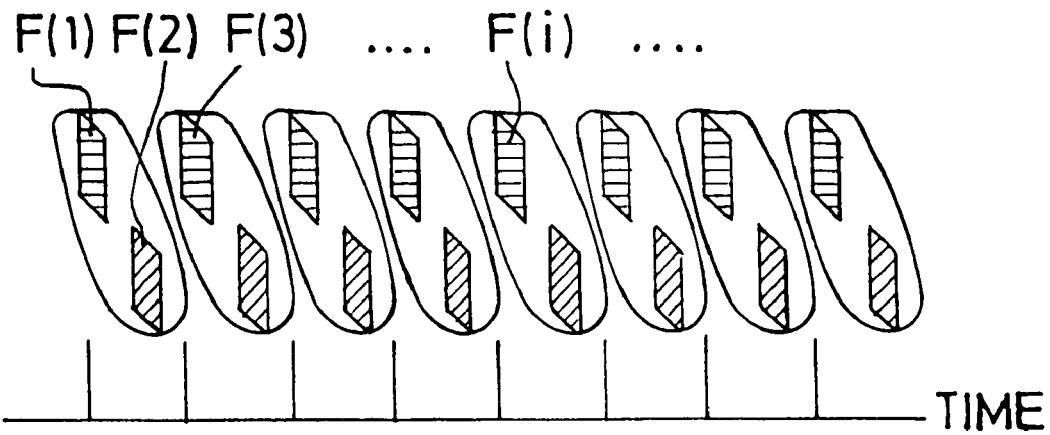
FIG. 1 shows, at a rate given by the associated synchronization signal on the time axis, a video sequence constituted by successive pairs of fields.
Figure 2:
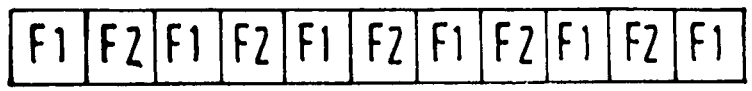
FIG. 2 shows the successive frames F1, F2 of a preexisting video material.
Figure 3:
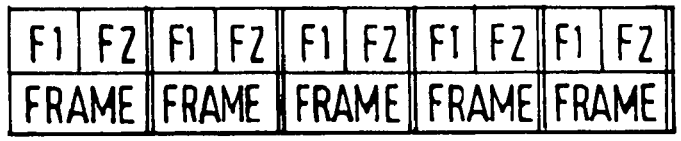
FIGS. 3 and 4 illustrate the structure of F1 dominant and F2 dominant video material.
Figure 4:
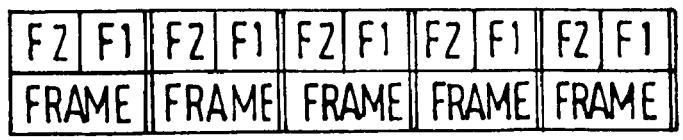
Figure 5:
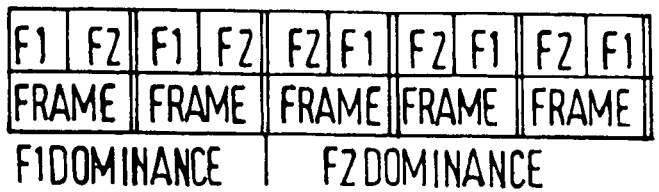
FIG. 5 illustrates the case of a video sequence in which a shift in the representation of the frames has occurred.
Figure 6:
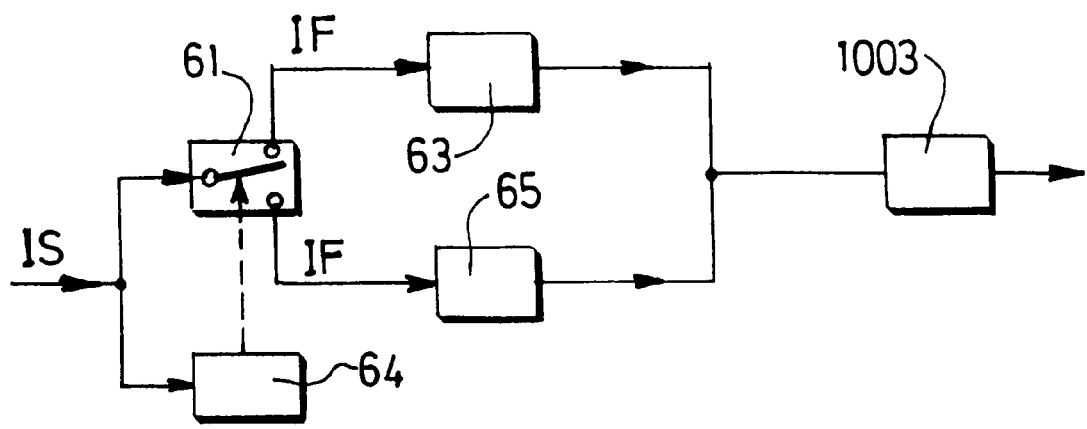
FIG. 6 shows an embodiment of a preprocessing device according to the invention.

An example of implementation of a preprocessing device according to the invention (before coding in a coding device 1003) is illustrated in FIG. 6, in the case the input video stream is a sequence composed of information corresponding to images of the video type, i.e. composed (as already shown in FIG. 1) of successive pairs of frames F(1), F(2), ..., F(i), ... and so on.

Figure 7:
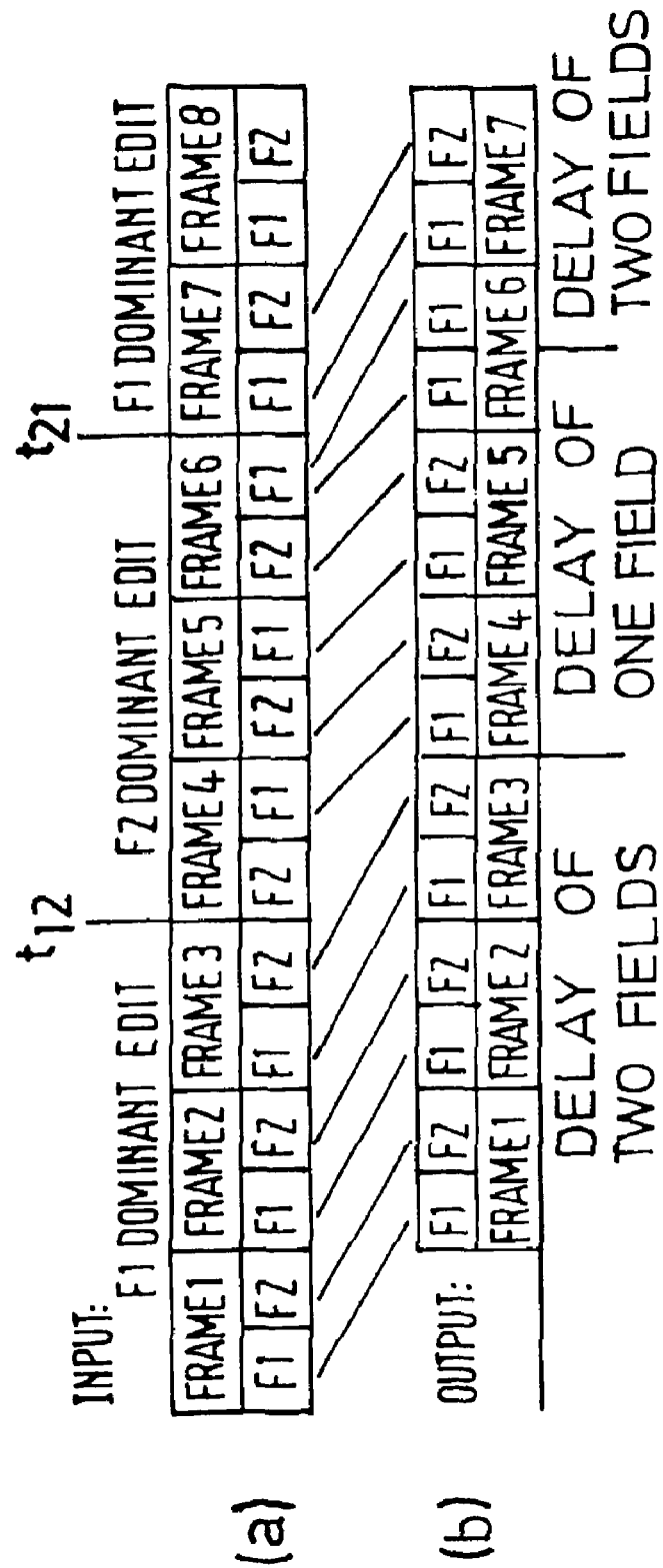
FIG. 7 illustrates the mechanism according to which the sequence is modified by suppression or repetition of a field, in relation with the type of dominance detection carried out in the preprocessing device.

Such a sequence is assumed to be F1 dominant, which corresponds in FIG. 6 to the upper position of a switch 61; each successive input field IF is then delayed in a memory 63, with a delay of two fields, or at least two fields (this delay is illustrated in line (b) of FIG. 7 for frames 1 to 3, by a comparison with the corresponding frames of the line (a)). When a change from "F1 dominant" to "F2 dominant" is detected by means of a circuit 64 for the detection of a field dominance change (instant t12 in line (a) of FIG. 7), the switch 61, controlled by this circuit 64, comes back to its lower position (see FIG. 6), for which each successive input field IF is now delayed in a memory 65, with a delay of only one field (or one field less, in the case of a greater delay for the memory 63). The first frame with F2 dominance is suppressed, and all the subsequent input fields are now delivered with only a "one field" duration delay (see the frames 4 and 5 in line (b) of FIG. 7), so that no gap occurs in the output sequence.

When a further change from "F2 dominant" to "F1 dominant" is detected by the circuit 64 (instant t21 in line (a) of FIG. 7), the last field F1 of the last F2 dominant frame is repeated in order to retrieve a correct sequencing: all the subsequent input fields are now, as initially, delivered again with a "two fields" duration delay (see the frames 6 and 7 in line (b) of FIG. 7), or one field more in the case of a greater delay for the memory 63.

The detection of dominance in the field dominance change detection circuit 64 is for instance made through the use of a scene cut detection method, carried out between consecutive fields. Such a method is described for example in documents such as "Hierarchical scene change detection in an MPEG-2 compressed video sequence", by T.Shin and al., Proceedings of the 1998 IEEE ISCAS, May 31, 1998, Monterey, Ca., USA, pp.IV-253 to IV-256, or "A unified approach to shot change detection and camera motion characterization", by P. Bouthemy and al., IEEE Transactions on Circuits and Systems for Video Technology, vol. 9, n°7, October 1999, pp. 1030–1044.

An improved embodiment of the invention may also be proposed in the following case. In the NTSC standard, the picture frequency is 30 interlaced frames per second. However, for movies, the frames are produced at a frame rate of 24 Hz. When it is required to visualize a sequence of film-type images on television, it is therefore necessary to convert the movie's frame rate to the NTSC standard. The technique currently used, which is known as "3:2 pull-down" and is described for instance in the international patent application WO 97/39577, consists of creating five interlaced frames (which can be therefore visualized on television) based on four original sequential film frames. This is obtained by dividing each of these four sequential frames by two, so as to form four odd and four even fields and by duplicating two of these eight fields.

Figure 8:
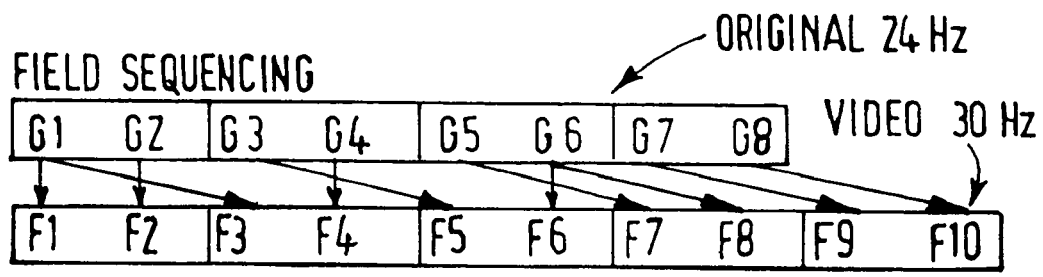
FIG. 8 illustrates the 3:2 pull-down technique which allows to construct a sequence of five interlaced frames, or pairs of fields F(n) to F(n+9), with n=1 in the present case, from four original sequential frames.

As illustrated in FIG. 8, which shows a film sequence at 24 Hz on the first line and illustrates on the second line how to organize the field sequencing of a corresponding video sequence at 30 Hz, it means that an additional field is inserted for each pair of film frames, for instance by splitting one film frame out of two into three fields, the other one being split as usually into two fields. In the case of the frame split into three fields (for instance, G1G2 split into F1, F2, F3, or G5G6 split into F6, F7, F8), the third one is obtained by copying the odd (F1) or the even field (F6) alternately, in order to keep the sequencing "odd/even". The result is the following:

F1=F3=G1
F2=G2
F4=G4
F5=G3
F6=F8=G6
F7=G5
F9=G7
F10=G8, and so on.

These two additional fields obtained by duplication constitute a redundant information. When encoding such sequences according to the MPEG-2 standard, it is interesting to detect said information: the suppression of these repeated fields will then free some space to better encode the others, the concerned MPEG-2 encoder thus receiving video-type image sequences at 30 Hz and original film-type image sequences at 24 Hz.

An usual criterion to detect automatically sequences coming from movies (film-type image sequences) is therefore the following: a structure of five frames—i.e. of ten fields—is analyzed by means of a subtraction of consecutive fields of the same parity. The condition to detect the 3:2 pull-down structure is the following:

F1=F3
F2≠F4

Figure 9:
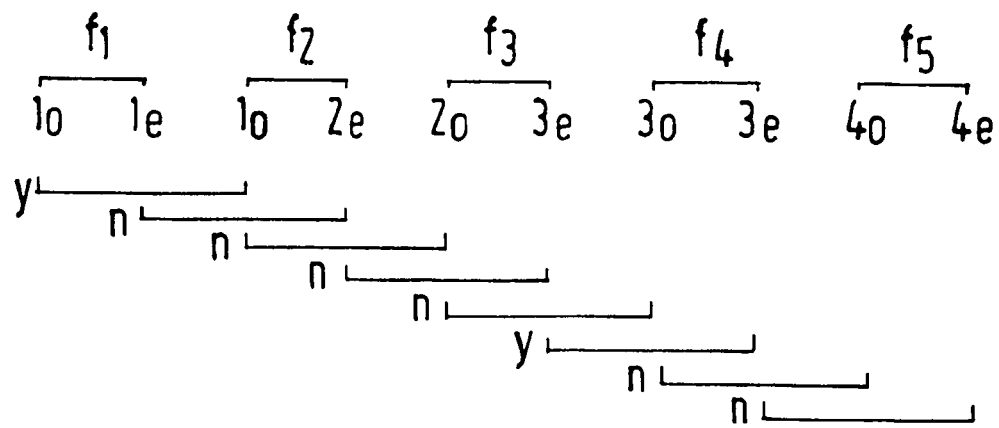
FIG. 9 shows how fields are sequenced for the film mode format and illustrates the set of tests (identical ? or not ?) to be carried out for the detection of a 3:2 pull-down structure.

F3≠F5
F4≠F6
F5≠F7
F6=F8
F7≠F9
F8≠F10, which is illustrated in the sequence of FIG. 9, where f1, f2, designate the successive frames, 1o–1e, 1o–2e, 2o–3e, . . . the corresponding pairs of fields, y the reply "yes" to the test of comparison (i.e. fields equal), and n the reply "no" (i.e. fields different). If all these conditions are satisfied, then the inverse 3:2 pull-down conversion is performed on a group of five frames; on the contrary, if one of these conditions is not valid, the encoder goes back to the video mode (no elimination of two fields).

However, due to the possible presence of noise on the original 3:2 pull-down sequence, the equality criterion between two fields (F1, F3 and F6, F8) may be not strictly verified. Two fields of the same parity F(N) and F(N+2) are considered. If NTOT designates the total number of pixels in a field (172800 for a full resolution), val (F(N)) designates the luminance value for a given pixel, N1 is the number of picture elements (pixels) such as ABS[val(F(N))–val (F(N+2))]>THRES1, Nm is the number of pixels such as ABS [val(F(N))–val (F(N+2))]<THRES2, N2 is the number of pixels such as N2=NTOT–Nm, and THRES1, THRES2 are predetermined thresholds, then the following test, Ratio 1 and Ratio 2 being values previously chosen, is carried out:

IF ((N1<Ratio 1) and (N2<Ratio 2)) THEN: $F(N)=F(N+2)$ ELSE: $F(N) \neq F(N+2)$

The first criterion (N1<Ratio 1) may be called "the dissimilarity criterion" and involves the number of pixels where the field-to-field pixel difference is large, while the second one (N2<Ratio2) may be called "the likeness criterion" and involves the number of pixels where the field-to-field pixel difference is small.

Troubles within the film mode detection step may consequently occur mostly in the case of the two following contrasted situations. For static or quasi-static sequences, the dissimilarity criterion is no more verified, since the fields are nearly all equal, and may be therefore suppressed, the residual conditions needed to be fulfilled being then only F1=F3 and F6=F8. But, for a very noisy sequence, with which two identical fields may however seem unlike, the threshold setting the likeness criterion cannot be too increased, otherwise fields that are different could be considered as identical. The criterion for detecting automatically sequences coming from movies may then be modified on the basis of the following remark. By looking at the N2 statistics (N2 has been defined hereinabove), the applicant has noticed that N2 for fields F1 and F3 (referenced N2[1,3]) and N2 for fields F6 and F8 (referenced N2[6,8]) are small compared to the others (more generally, N2[i,j] stands for statistics of N2 calculated for Fj–Fi). Then, by computing the difference between two consecutive N2 statistics, for instance: N2[6,8]–N2[5,7], and comparing—in the form of a percentage—such a difference to a predetermined threshold (according to an expression of the following form: N2[5,7]–N2[6,8] ×100/NTOT for example), a large value of percentage is obtained every five computations. Therefore, if the computed percentage is less than X %, with for instance X=30%, then both fields (of the last considered pair of fields) are considered as equal, and the inverse 3:2 pull-down processing is carried out for the next five frames.

Figure 10:
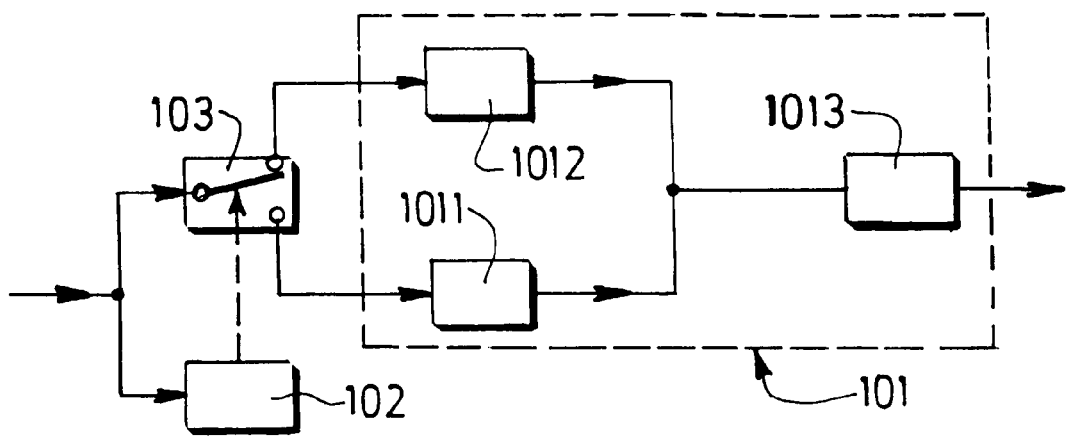
FIG. 10 shows an encoding system in which the method according to the invention is implemented.

An encoding system in which this preprocessing operation is included is described with reference to FIG. 10. This encoding system comprises means 101 for encoding input signals corresponding to a sequence either coming from movies or of video type, means 102 for detecting in said input signals a sequence of film type (said detecting means being a detecting stage activated as explained later), and means 103 for switching, only when such a detection has occurred, from a first to a second mode of operation of the encoding means 101. The encoding means 101 comprise a first preprocessing device 1011, a second preprocessing device 1012, and a coding device 1013, for instance an MPEG-2 coder.

Figure 11:
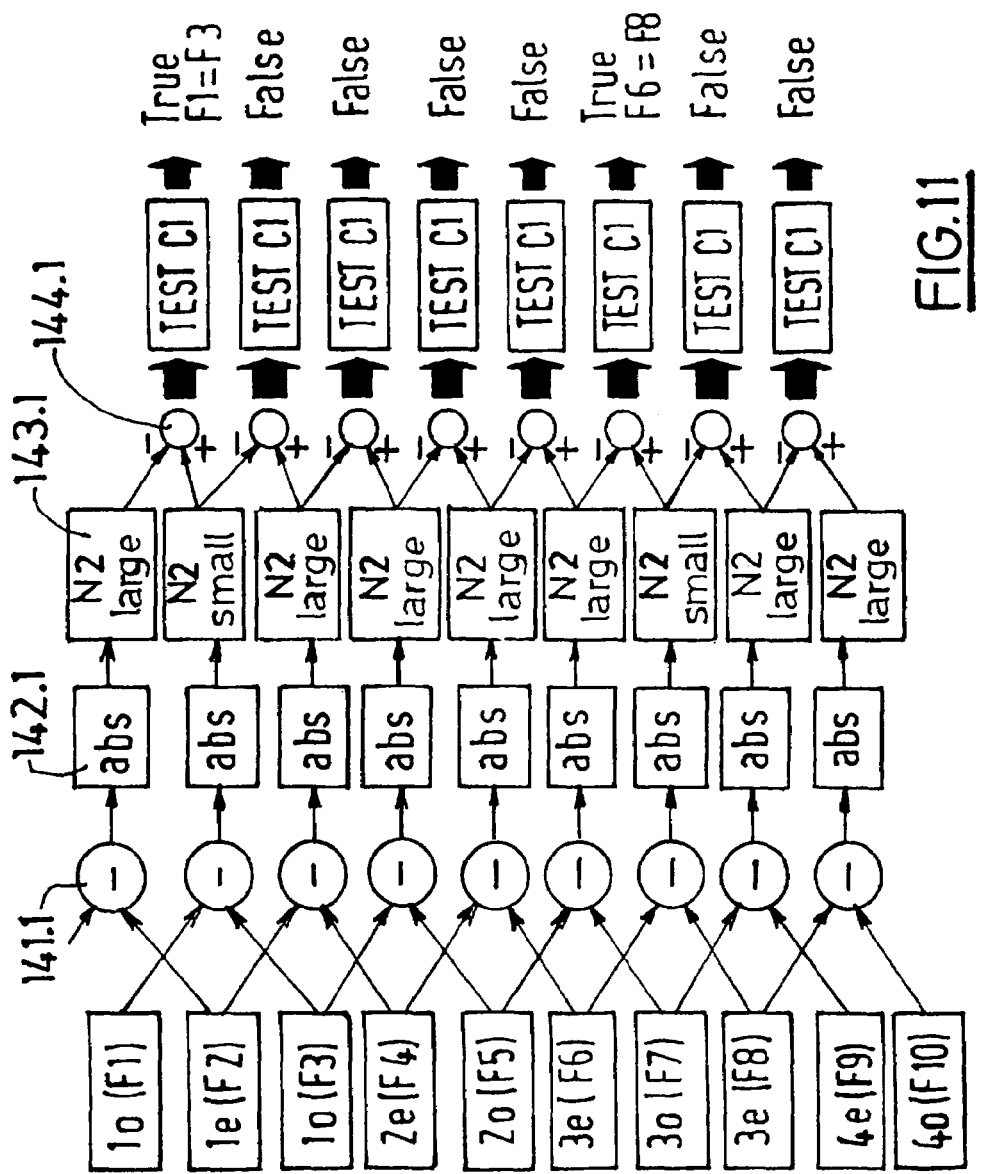
FIG. 11 is an implementation of a preprocessing device comprised in the encoding device of FIG. 10.

The detecting stage, illustrated in FIG. 11, itself comprise a set of subtractors 141.1, 141.2, 141.3, . . . , provided for receiving each one two successive fields of the same parity and determining per pixel the difference between these fields, followed by a set of circuits 142.1, 142.2, 142.3, . . . , provided for taking the absolute value of said difference; this value is stored in a memory, 143.1, 143.2, 143.3, . . . , respectively. The successive differences between the successives values of these stored absolute values are then computed in subtractors 144.1, 144.2, 144.3, . . . , and these differences, for instance multiplied by 1100/NTOT as indicated above, are compared to the predefined threshold (tests C1). If the fields are equal, i.e. they correspond to film-type images (in the present case, for F1=F3 and for F6=F8), an inverse 3:2 pull-down processing can be carried out for the next five frames, in the first preprocessing device 1011; this situation corresponds to the lower position of the switching means 103. When it is not the case (video-type images), the switching means 103 are in the opposite position (upper position). The device 1011 is then de-activated, and in the same time the second preprocessing device 1012 becomes active (this device 1012 has exactly the same structure as the preprocessing device of FIG. 6).

An encoding system corresponding to this last description may be used for transmitting animated images with television systems operating at a frequency of 60 hertz (for instance with the NTSC standard used in countries such as Japan or the United States of America).

What is claimed is:

1. A method for encoding video signals corresponding to a sequence of frames each of which originally consists of two fields F1 and F2, in which the encoding step is preceded by a preprocessing step which itself comprises the sub-steps of:
   (A) receiving the successive frames and delaying each of them with a delay of at least two fields;
   (B) adjusting said delay according to the following dominance change criterion:
      (a) when a change from an F1 dominance to an F2 dominance is detected, the first field of the first F2 dominant frame is suppressed, said delay being therefore decreased by a quantity equal to "one field" duration;
      (b) when a change from an F2 dominance to an F1 dominance is detected, the last field of the last F2 dominant frame is repeated, the delay being therefore increased by a quantity equal to "one field" duration.

2. The method according to claim 1, said sequence of frames being constituted either by film-type images, to which a 3:2 pull-down technique has been applied, or by video-type images consisting of two fields, said method comprising the steps of:

(A) detecting that the current sequence is constituted by film-type images (B) encoding said current sequence, either after said preprocessing step when it is not detected as being of film-type or after implementation, on said current sequence, of the inverse 3:2 pull-down technique if it is detected as being of film-type;

and said detecting step comprising the sub-steps of:

(a) defining for two successive fields F(n) and F(n+2) of the same parity a number of pixels N2 such as N2=NTOT−N'2, where NTOT is the number of pixels in a field, N'2 is the number of pixels for which ABS (val F(n)−val F(n+2))<TH2, ABS designates the function "absolute value", val designates the luminance of a pixel, and TH2 is a first predefined threshold;

(b) comparing the result of the subtraction of two consecutive numbers N2, divided by NTOT, to a second predefined threshold THR;

(C) detecting that the current sequence is constituted by film-type images only when said result is lower than said second threshold, said fields being then considered as equal.

3. A device for encoding video signals corresponding to a sequence of frames each of which originally consists of two fields F1 and F2, said sequence being constituted either by film-type images, to which a 3:2 pull-down technique has been applied, or by video-type images consisting of two fields, said device comprising:

(A) means for detecting in the input sequence of frames a sequence of film-type images;

(B) means for receiving the successive frames of the input sequence, delaying each of them with a delay of at least two fields, and adjusting said delay according to the following dominance charge criterion:

(a) when a change from an F1 dominance to an F2 dominance is detected, the first field of the first F2 dominant frame is suppressed, said delay being therefore decreased by a quantity equal to "one field" duration;

(b) when a change from an F2 dominance to an F1 dominance is detected, the last field of the last F2 dominant frame is repeated, the delay being therefore increased by a quantity equal to "one field" duration;

(c) means for encoding the input sequence of frames, either connected in series with means (B) when said sequence is not detected as being of film-type or after implementation of the inverse 3:2 pull-down technique if it is detected as being of film-type.

4. The device according to claim 3, in which said detecting means comprise a set of subtractors, provided for receiving each one two successive fields of the same parity and determining per pixel the difference between these fields and followed by a set of circuits provided for taking the absolute value of said difference and storing it, computing in subtractors the successive differences between the successive values of these stored absolute values, comparing these differences to a predefined threshold, and detecting a sequence of film-type only when said difference is lower than a predefined threshold, said fields being then considered as equal.

5. A system for pre-processing video signals corresponding to a sequence of frames each of which originally consists of two fields F1 and F2, prior to encoding, said system comprising:

a processor in communication with a memory, said processor executing code for:

(A) receiving said successive frames and delaying each of them with a delay of at least two fields;

(B) adjusting said delay according to the following dominance change criterion:

(a) when a change from an F1 dominance to an F2 dominance is detected, the first field of the first F2 dominant frame is suppressed, said delay being therefore decreased by a quantity equal to "one field" duration;

(b) when a change from an F2 dominance to an F1 dominance is detected, the last field of the last F2 dominant frame is repeated, the delay being therefore increased by a quantity equal to "one field" duration.

6. The system according to claim 5, wherein said sequence of frames being constituted either by film-type images, to which a 3:2 pull-down technique has been applied, or by video-type images consisting of two fields, wherein the processor further executing code for:

(A) detecting that the current sequence is constituted by film-type images;

(B) encoding said current sequence, either after said preprocessing step when it is not detected as being of film-type or after implementation, on said current sequence, of the inverse 3:2 pull-down technique if it is detected as being of film-type; and (C) detecting that the current sequence is constituted by film-type images only when said result is lower than said second threshold, said fields being then considered as equal.

7. The system according to claim 6, wherein the code for detecting in step (A) further comprises code for:

(a) defining for two successive fields F(n) and F(n+2) of the same parity a number of pixels N2 such as N2=NTOT−N'2, where NTOT is the number of pixels in a field, N'2 is the number of pixels for which ABS (val F(n)−val F(n+2))<TH2, ABS designates the function "absolute value", val designates the luminance of a pixel, and TH2 is a first predefined threshold; and (b) comparing the result of the subtraction of two consecutive numbers N2, divided by NTOT, to a second predefined threshold THR.

* * * * *